(12) United States Patent
Kessler (10) Patent No.: US 7,975,834 B2
(45) Date of Patent: Jul. 12, 2011

(54) BEARING MOUNT FOR A WORM GUIDE BAR

(75) Inventor: Günter Kessler, Frankfurt am Main (DE)

(73) Assignee: Poly-clip System GmbH & Co. KG (DE)

( * ) Notice: Subject to any disclaimer, the term of this patent is extended or adjusted under 35 U.S.C. 154(b) by 148 days.

(21) Appl. No.: 12/544,245

(22) Filed: Aug. 20, 2009

(65) Prior Publication Data

US 2010/0046865 A1 Feb. 25, 2010

(30) Foreign Application Priority Data

Aug. 21, 2008 (DE) .......................... 10 2008 039 154

(51) Int. Cl.
*A22C 11/00* (2006.01)
*B65G 47/61* (2006.01)
(52) U.S. Cl. .......... 198/673; 198/669; 452/51; 452/182; 452/186
(58) Field of Classification Search .................. 198/673, 198/669; 452/51, 181, 182, 186
See application file for complete search history.

(56) References Cited

U.S. PATENT DOCUMENTS

| | | | | |
|---|---|---|---|---|
| 1,754,294 | A | * | 4/1930 | Winter ........................... 198/661 |
| 3,845,855 | A | * | 11/1974 | Schwarz et al. ............... 198/685 |
| 4,268,385 | A | * | 5/1981 | Yoshikawa ..................... 210/150 |
| 4,547,931 | A | * | 10/1985 | Staudenrausch et al. ....... 452/51 |
| 5,197,915 | A | * | 3/1993 | Nakamura et al. .............. 452/51 |
| 5,354,230 | A | * | 10/1994 | McFarlane et al. ............. 452/51 |
| 2005/0042979 | A1 | * | 2/2005 | Sames ............................. 452/51 |

FOREIGN PATENT DOCUMENTS

| | | |
|---|---|---|
| DE | 38 06 467 C1 | 5/1989 |
| DE | 10 2006 054039 A1 | 5/2008 |
| EP | 1 891 860 A | 2/2008 |
| EP | 1 897 446 A | 3/2008 |

OTHER PUBLICATIONS

EP 09 00 9526 Search Report.

\* cited by examiner

*Primary Examiner* — Mark A Deuble
(74) *Attorney, Agent, or Firm* — Hahn Loeser & Parks LLP (57) ABSTRACT

A device for transferring sausage-shaped products, carried out of a clipping machine and provided with loop-shaped suspension elements, to a product receiving element, said device containing: a guide bar along which the suspension elements can be guided in the direction of transport by means of conveyor elements, and a front and a rear bearing assembly for the guide bar, the bearing assemblies having a right-hand and a left-hand bearing unit that are each disposed in pairs laterally from the guide bar. It is further provided that the front and rear bearing assemblies form drivable positive guidance mechanisms for the suspension elements.

22 Claims, 5 Drawing Sheets

BEARING MOUNT FOR A WORM GUIDE BAR

BACKGROUND AND SUMMARY OF THE INVENTION

The invention relates to a transfer. In particular, the invention relates to a device for transferring sausage-shaped products, that are carried out of a clipping machine and provided with loop-shaped suspension elements, to a product receiving element, the device comprising a guide bar along which the suspension elements can be guided in the direction of transport by means of conveyor elements, and further comprising front and rear bearing assemblies for the guide that, in each case, are disposed in pairs laterally from the guide bar.

It is known, in practice, that when producing sausage-shaped products, which may be sausage products filled with sausage meat, or other sausage-shaped products filled with liquid, pasty or granular material, such as sealing compound, etc., the filling material is fed by a filling machine via a filling tube to a clipping machine. In the clipping machine, the filling material is stuffed into a tubular casing material, which is closed at one end by a first clip, and the open end of the tubular casing material is subsequently closed by placing a second clip. If the resultant sausage-shaped product is to be suspended for further processing from a product receiving element, such as a smoking rod, a suspension element, in most cases a thread loop, is preferably inserted into the second clip and fixed to the sausage-shaped product by means of the second clip. The sausage-shaped product is subsequently carried out of the clipping machine by means of a transport device and strung with other sausage products in rows on the receiver rods in order to be further processed.

A device of the kind specified at the outset is known from German patent specification DE 38 06 467. In order to transfer sausage-shaped product, carried out of the clipping machine and provided with loop-shaped suspension elements, to a smoking rod, the loops of the sausage-shaped products are guided in the device over a guide bar. The guide bar has piston/cylinder arrangements disposed as supports laterally adjacent to the guide bar, which are arranged one after the other in the direction of transport of the sausage-shaped products on both sides of the guide bar, but offset in relation to each other. The pistons are moved horizontally towards the guide bar at an approximately right angle to the longitudinal extension of the guide bar, engage in recesses in the guide bar and in this way hold the latter in the desired position. If the loop of a sausage is moved over the guide bar, the cylinders are made to disengage from the guide bar one after the other in the respective sequence, in order to re-engage with the guide bar immediately after the loop has passed.

To ensure trouble free functioning of the bearing mount for the guide bar, the previously known transfer device requires a complex control mechanism, which ensures that sufficient pistons engage at all times with the guide bar, so that the latter is securely held in the correct position. Furthermore, the speed of piston movement cannot be increased at will, firstly due to the inertia of the components, but also for safety reasons, because when the speed of the pistons moving back and forth is too high, it can no longer be ensured that the guide bar can still be held securely in position.

An object of the present invention is therefore to provide a transfer device of the kind initially specified that makes transfer of the products being transferred more reliable even at higher transport speeds.

More particularly, a device is proposed for transferring sausage-shaped products, carried out of a clipping machine and provided with loop-shaped suspension elements, to a product receiving element, in order to achieve the aforesaid object. The transfer device contains a guide bar along which the suspension elements can be guided in the direction of transport by means of conveyor elements, as well as one front and one rear bearing assembly for the guide bar, said assemblies each having a right-hand and a left-hand bearing unit disposed in pairs laterally from the guide bar. The front and rear bearing assemblies form drivable positive guidance mechanisms for the suspension elements. In this way, the guide bar can be held securely in position even at higher transport speeds, while simultaneously guaranteeing that further transport of the suspension elements is very reliable.

To ensure further transport of the suspension elements, it is advantageous when the positive guidance mechanism for the suspension elements is formed by a guide gap defined between mutually contacting and rotating bearing elements of the bearing units. The guide gap may extend in the axial direction, that is to say, in the direction of transport of the suspension elements, along the mutually contacting surfaces of the rotating bearing elements.

It is also advantageous in this regard when at least the mutually contacting surface sections of the bearing elements of the bearing units have a high friction coefficient at least in sections thereof. This means that it suffices if only one of the rotating bearing elements is driven. A suitable friction coefficient can be achieved by selecting the material and the surface characteristics of the bearing elements accordingly. One way of achieving this is to provide an elastic surface, for example by applying a rubber coating.

It is also preferred that at least one part of the bearing elements of the bearing units be provided at its outer circumference with at least one circumferential groove extending in the form of a thread in the direction of transport. In this case, the groove forms a circumferential thread-shaped guide gap in which the suspension element, such as a thread loop, can be securely guided and further transported. In this region of the transfer device, any additional transport device would also be unnecessary. Such a region is likewise suitable as a transfer region, for example between two transport devices connected downstream one after the other, or between a transport device and a device connected downstream therefrom.

In the transfer device according to one embodiment of the invention, it may also be provided that the right-hand and left-hand bearing units of the front and rear bearing assemblies each have at least one support bearing element and two counter bearing elements, wherein the central longitudinal axis of the support bearing element and the central longitudinal axis of the two counter bearing elements of a bearing unit are arranged in relation to one another in such a way that, when viewed in a plane perpendicular to the direction of transport, they span a triangle. The two counter bearing elements of a bearing unit may be arranged one above the other, when viewed in a plane perpendicular to the direction of transport.

By means of the arrangement of the support bearing element and the counter bearing element as described above, the support bearing element is in at least approximately linear contact with the two counter bearing elements at all times, thus providing reliable support and bearings for the guide bar. Any rotation of the guide bar about its longitudinal axis and any displacement in the direction of transport is effectively prevented.

The elements of the bearing units may be configured in many different ways. In one particularly advantageous embodiment, the counter bearing elements of a bearing unit are formed by counter bearing shafts that are rotatable about their central longitudinal axis, and whose axes preferably extend substantially parallel to the direction of transport.

The support bearing element of a bearing unit may be disposed laterally from and between the two counter bearing elements, when viewed in a plane perpendicular to the direction of transport. It may be formed by a drivable support shaft, the axis of which preferably extends substantially parallel to the direction of transport.

In another advantageous embodiment, the support bearing elements of the two right-hand and/or of the two left-hand bearing units of the front and rear bearing assemblies are formed by a common support shaft. This simplifies construction of the bearing units and of the drive for the support shaft elements.

It may be preferable here that the support shafts of the right-hand and left-hand bearing units are driven synchronously and in opposite directions by a preferably common drive unit. A common drive unit simplifies control, for example of the drive speed. Driving the support shafts in contrary directions prevents any canting or jamming of the guide bar between the bearing units.

In one particularly preferred configuration of the bearing units, the support bearing element of a bearing unit may have a convex protuberance or a concave recess at its outer circumference. The counter bearing elements of a bearing unit may then be provided at their outer circumference with a configuration in the form of a concave recess or convex protuberance corresponding to the convex protuberance or to the concave recess of the support bearing element and mutually engaging therewith.

This mutual engagement of the concave recesses and convex protuberances of the support bearing element and the counter bearing element guarantees that the guide bar is securely held in place. These matching shapes prevent any shifting of the guide bar in its axial direction and also forms a centering means with which the position of the guide bar can be precisely defined.

The bearing assemblies may each contain bearing units that are advantageously disposed opposite one another on the side surfaces of the guide bar. In another preferred embodiment, the guide bar may be formed by a beam of preferably substantially rectangular cross-section, wherein a front bearing assembly of the beam may be disposed in the front region of the guide bar, in relation to the direction of transport, and, spaced apart therefrom, a rear bearing assembly may be disposed in the rear region of the guide bar, in relation to the direction of transport. The planar surfaces of the beam facilitate the lateral arrangement of bearing elements. Providing a groove for engagement of the hook elements is also simplified by a planar top side.

Engagement of the front and the rear bearing assemblies at the two respective side surfaces of the guide bar can ensure that the regions above and below the guide bar remain free for the sausage-shaped products to be transported, and/or for the hook-shaped transfer element.

According to one embodiment of the invention, the counter bearing elements of the right-hand and left-hand bearing units may be disposed inside the guide bar. It is advantageous when, in the region of the front and rear bearing assemblies as viewed in the direction of transport, the guide bar has successive, preferably substantially rectangular recesses that are also disposed preferably opposite one another on the side surfaces on either side of the guide bar, and in which the counter bearing elements are also preferably disposed. The counter bearing elements may also extend advantageously over the entire length of the rectangular recesses. Disposing the counter bearing elements in the recesses of the guide bar prevents components from protruding, which would obstruct transport of the suspension elements.

Due to the guide bar having at least one groove on its top side and extending over the entire length of the guide bar, a hook-shaped transfer element guided over the guide bar may engage, as a conveyor element for the sausage-shaped products, in the groove and grip the product securely at its loop-shaped suspension element.

It is advantageous when the guide bar has receiving means at its ends for connecting additional devices. By means of such receiving means, the transfer device according to the invention can be integrated in suitable suspension lines. Secure connection of additional devices can also be achieved with such receiving means, thus increasing process reliability.

Other advantageous configurations and an embodiment of the invention shall now be described with reference to the description of an embodiment and to the attached drawings. The terms "top", "bottom", "left" and "right" used when describing the embodiment relate to the drawings oriented in such a way that the reference signs and names of the figures can be read normally.

DETAILED DESCRIPTION

Figure 1:
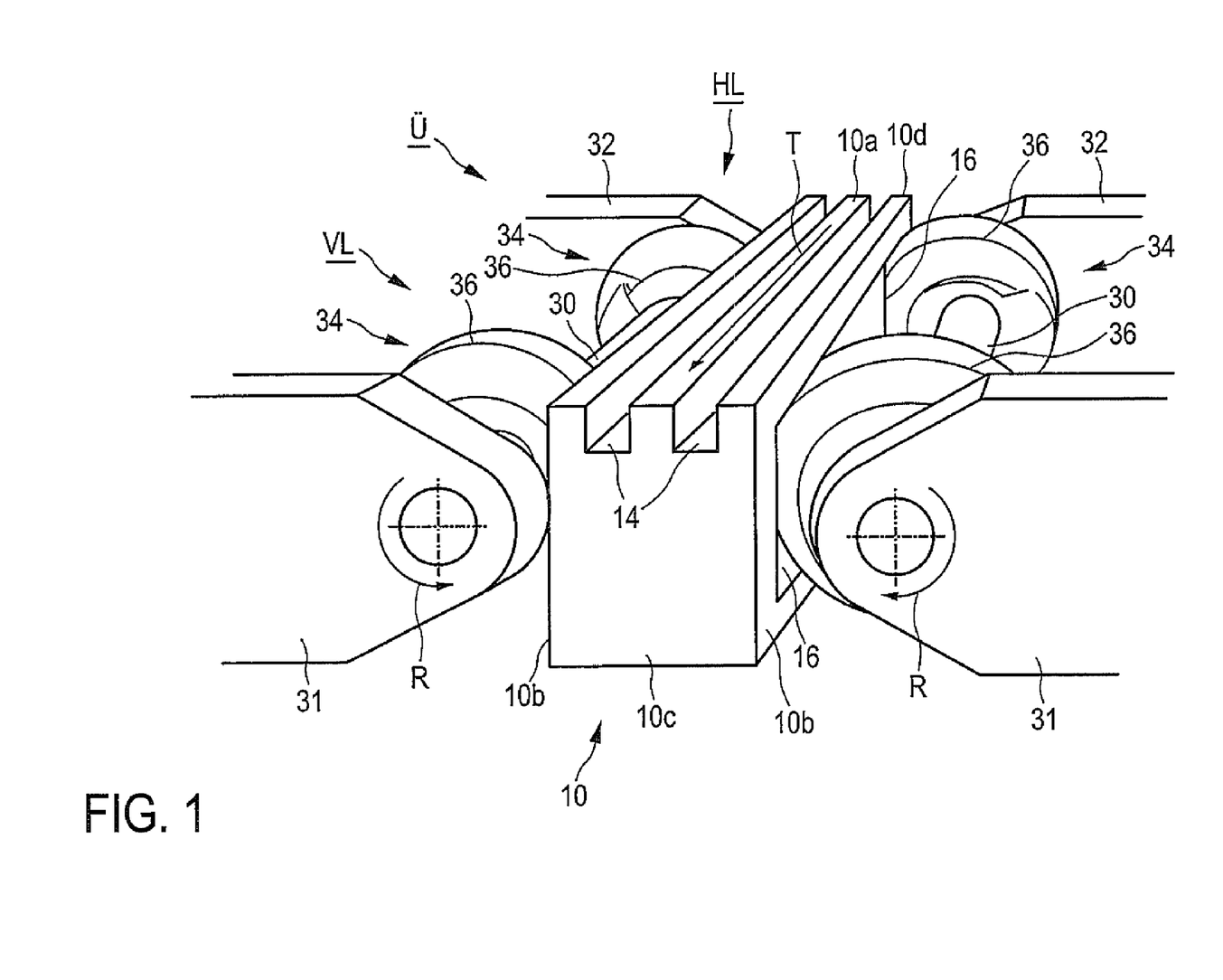
FIG. 1 is a perspective, schematic view of the transfer device according to an embodiment of the invention.

FIG. 1 shows a perspective, schematic view of the inventive transfer device Ü. The transfer device has as its main components a guide bar 10, as well as a front and a rear bearing assembly VL, HL. Along guide bar 10, sausage-shaped products suspended on suspension loops (not shown) can be transported in conveying direction T by means of conveyor elements (not shown). Front and rear bearing assemblies VL, HL are used as a floating mount for guide bar 10, such that transport of the sausage-shaped products is not obstructed.

Guide bar 10 has a substantially rectangular cross-section and extends in a horizontal direction. In the embodiment shown, the side edges of the rectangular cross-section of guide bar 10 are longer than its top and bottom edges. Guide bar 10 is made of a metal, for example aluminum. However, it may also be made of plastic or a stainless steel, according to the chosen application.

On the top side 10a of guide bar 10, two grooves 14 that likewise have a rectangular cross-section extend parallel to each other and to the central longitudinal axis (not shown) of guide bar 10. The spaced apart grooves 14 are arranged symmetrically on the top side 10a of guide bar 10, i.e., grooves 14 are equidistant from side surfaces 10b.

Guide bar 10 also has four rectangular recesses 16, two of which being disposed opposite one another on either side surface 10b of guide bar 10 near end faces 10c, 10d thereof. In FIG. 1, all that can be seen is one recess 16 on the right-hand side surface 10b visible in FIG. 1.

The left-hand and right-hand bearing units 30, 34; 40, 42 of the front and rear bearing assemblies VL, HL are identical in structure, so the right-hand bearing unit 30, 34; 40, 42 of front bearing assembly VL shall be described in the following as representative for all other bearing units. It essentially contains a support bearing element 30, 34 and a counter bearing element 40, 42. Support bearing element 30, 34 is formed by a support shaft 30 and protuberance 34.

In a center plane extending horizontally through guide bar 10, as well as alongside guide bar 10 and parallel thereto on the right and left, support shafts 30 are disposed equidistant from guide bar 10. Support shafts 30 can be rotated in the region of their ends in bearing mounts 31, 32 and are held in an axially non-displaceable manner. Bearing mounts 31, 32 are formed of ball bearings or the like that are known per se and which are accommodated in corresponding bearing shells. Bearing mounts 31, 32 likewise have adjustment elements (not shown) for adjusting the bearing clearance and for accurate orientation of support shafts 30 in relation to guide bar 10. Bearing mounts 31, 32 are supported on a machine frame (not shown). The rear end of support shaft 30, which is not visible in FIG. 1, projects from bearing mount 32 and has a receiving means for a drive element Z2 (shown in FIG. 4), such as a gear wheel or a pulley, by means of which a torque can be transferred to support shaft 30, and as described in further detail with reference to FIG. 4. This receiving means can be realized by a groove for a tongue and groove connection or other known shaft-hub connections.

Figure 3:
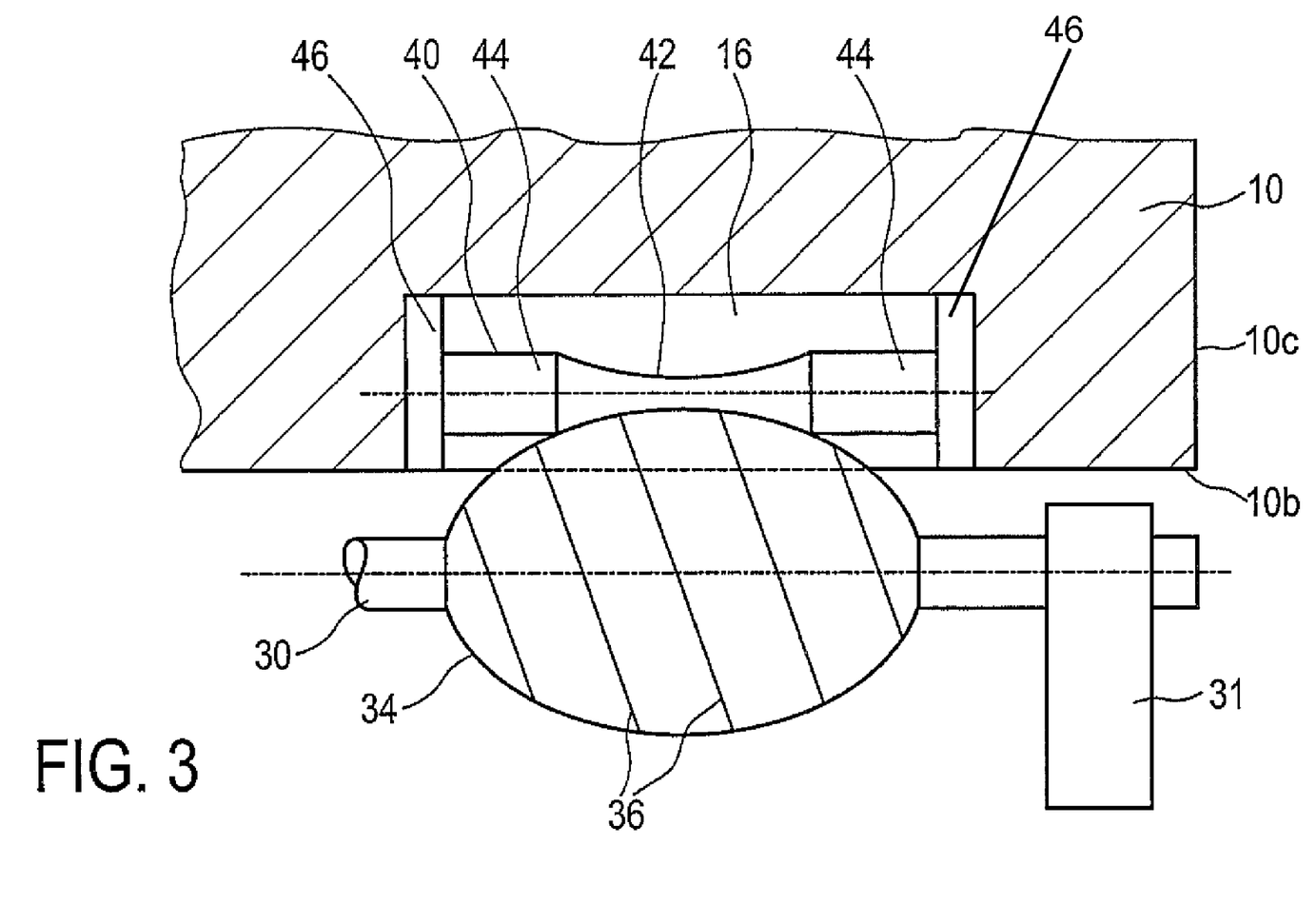
FIG. 3 is a horizontal, schematic partial cross-sectional view of a bearing assembly of the transfer device shown in FIG. 2.

As can also be seen in FIGS. 1 and FIG. 3, support shaft 30 has at its middle protuberances or bulges 34 that have a convex outer surface. Grooves 36 are disposed in the form of a thread on the surface of protuberances 34 and extend in the direction of transport T. Instead of the thread-shaped grooves, ribs that likewise extend in the form of a thread may be provided.

The distance of support shaft 30 from guide bar 10, and the shape, diameter and position of protuberances 34 on support shaft 30 are chosen in such a way that protuberances 34 engage in the rectangular recesses 16 in guide bar 10. They come into contact only with the two counter bearing elements 40 disposed in recesses 16 of guide bar 10, which will be described in more detail with reference to FIGS. 2 and 3.

These protuberances 34 can be produced in one piece with support shaft 30. However, they can also be produced as separate components and mounted on support shaft 30 using suitable fixing means. In the latter case, protuberances 34 can subsequently be axially aligned on support shaft 30 by axial displacement.

The direction of rotation of support shafts 30 is marked with an "R". As can be seen in FIG. 1, the two support shafts 30 rotate in opposite directions. The thread grooves disposed on the surface of the protuberances 34 extend in the same direction on the protuberances 34 of one support shaft 30 and in opposite directions on the protuberances 34 arranged opposite one another. By virtue of this orientation of thread grooves 36 on protuberances 34, a loop around guide bar 10 is transported in the direction of transport T when passing bearing assemblies VL, HL.

As shown in FIG. 1, the right-hand support shaft 30 rotates clockwise, whereas the left-hand shaft 30 rotates anti-clockwise. Due to these preferred rotational directions of support shafts 30, a force acting vertically upwards on guide bar 10 is generated, which counteracts the weight force of the sausage-shaped products suspended by their suspension elements on guide bar 10 and, which prevents any wedging of guide bar 10 between bearing assemblies VL, HL. Of course, it is also possible to choose any other directions of rotation than those shown, since the design of bearing assemblies VL, VH guarantees reliable operation.

Figure 2:
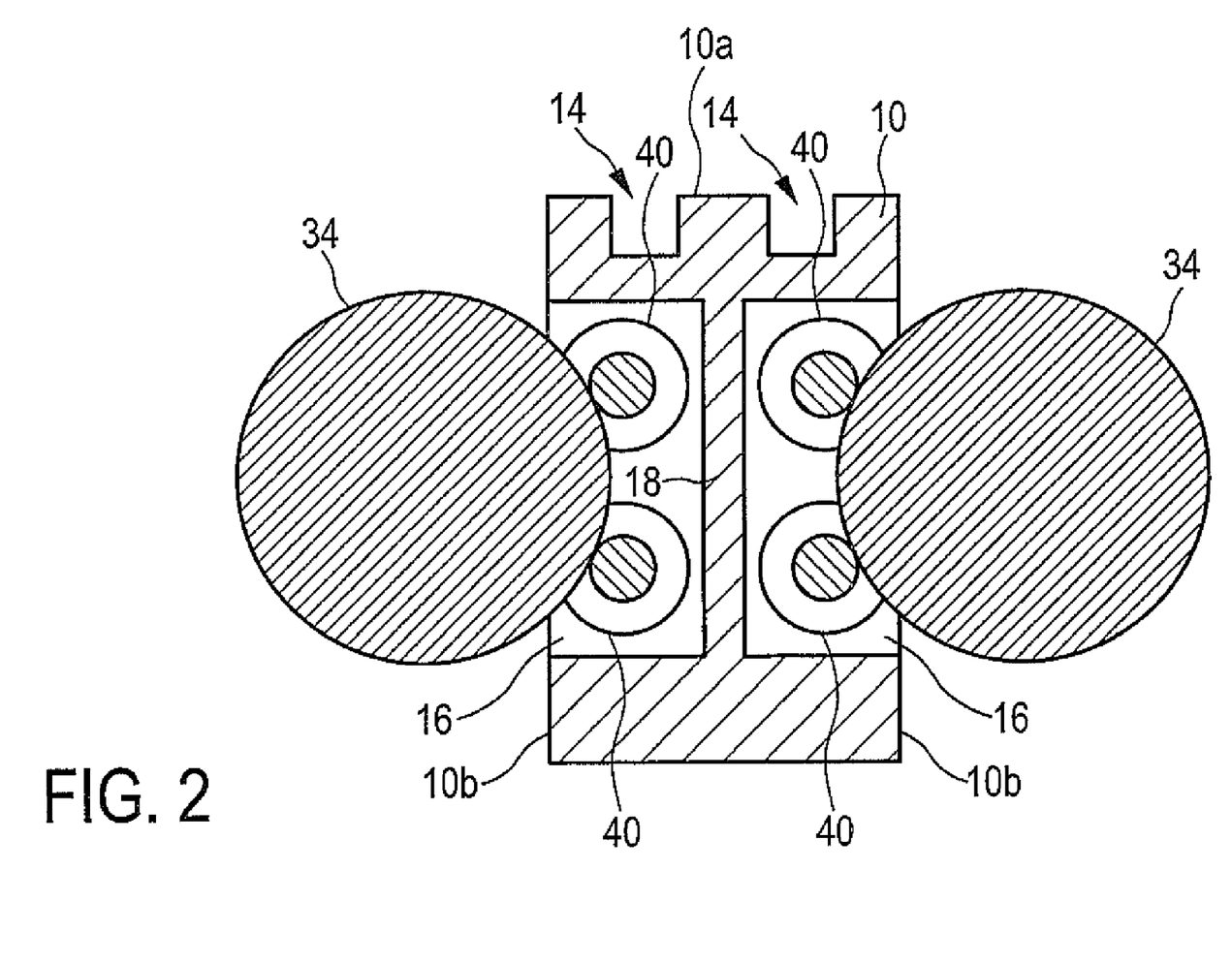
FIG. 2 is a vertical sectional view through a bearing assembly provided on the transfer device shown in FIG. 1.

FIG. 2 shows a cross-section through one of the two identical bearing assemblies VL, VH of guide bar 10 in a plane perpendicular to support shaft 30. In guide bar 10, the rectangular recesses 16 opposite one another are arranged symmetrically to one another. They are vertically aligned in the middle of the guide bar and extend from side surfaces 10b into the interior of guide bar 10. Recesses 16 are separated from each other by a web 18 that runs perpendicularly through the middle of guide bar 10.

In each recess 16, two counter bearing elements 40 in the form of rotatable counter bearing shafts are disposed. They extend axially parallel to support shaft 30 and are aligned vertically one above the other. They are also vertically equidistant from a notional plane through support shafts 30. Due to this arrangement of counter bearing elements 40, protuberance 34 contacts both counter bearing elements 40 of a recess 16 at all times.

FIG. 3 shows a horizontal partial section through the front bearing assembly VL of guide bar 10, as seen in FIG. 1. One of the two counter bearing shafts 40 is depicted in recess 16. The substantially cylindrical counter bearing shaft 40 has a middle portion 42 with a convex surface. It is adjoined to the right and left by cylindrical portions 44 accommodated in bearing shells 46. Counter bearing shafts 40 are mounted in bearing shells 46 so as to be rotatable about their longitudinal axis and axially fixed. The height and depth of bearing shells 46 corresponds to the clear height and depth of recesses 16, such that they are flush with the side surfaces 10b of guide bar 10. Ball bearings, for example, can be placed inside bearing shells 46. However, the bearings of counter bearing shafts 40 in bearing shells 46 may also be sliding bearings.

As can also be seen in FIG. 3, the length of counter bearing shafts 40 with bearing shells 46 affixed thereto corresponds to the length of recesses 16. This means that the unit comprising counter bearing shafts 40 and bearing shells 46, which is used in the form of a module, for example, is unable to cant or tilt inside recess 16. It requires only a small amount of axial play to enable rotation of the support elements.

As already mentioned, support shaft 30 extending parallel to guide bar 10 has protuberances 34. Protuberance 34, shown schematically in FIG. 3, has grooves 36, likewise shown schematically, that extend in the form of a thread. It suffices for the transport function when only one thread groove 36 is disposed on protuberance 34. However, there may also be more than one thread groove 36. By changing the number or pitch of thread grooves 36, while keeping the rotational speed of support shaft 30 constant, it is possible to change the speed of transport.

FIG. 3 also shows that the curvature of the concave surface of portion 42 of counter bearing shaft 40 matches the curvature of convex protuberance 34. This ensures that protuberance 34 can contact concave portion 42 of counter bearing shaft 40 at all times along a line which extends in axial direction across its concave surface, and hence that guide bar 10 is securely supported. This line is interrupted by thread grooves 36, with the consequence that protuberance 34 and concave portion 42 of counter bearing shaft 40 contact each other at several points along the line described above. The number of these points of contact per line is determined by the number and pitch of thread grooves 36.

Since at least two counter bearing shafts 40 are disposed in each recess 16, there are at least two such lines of contact or lines of contact points with the respective counter bearing shaft 40 for each protuberance 34.

Figure 4:
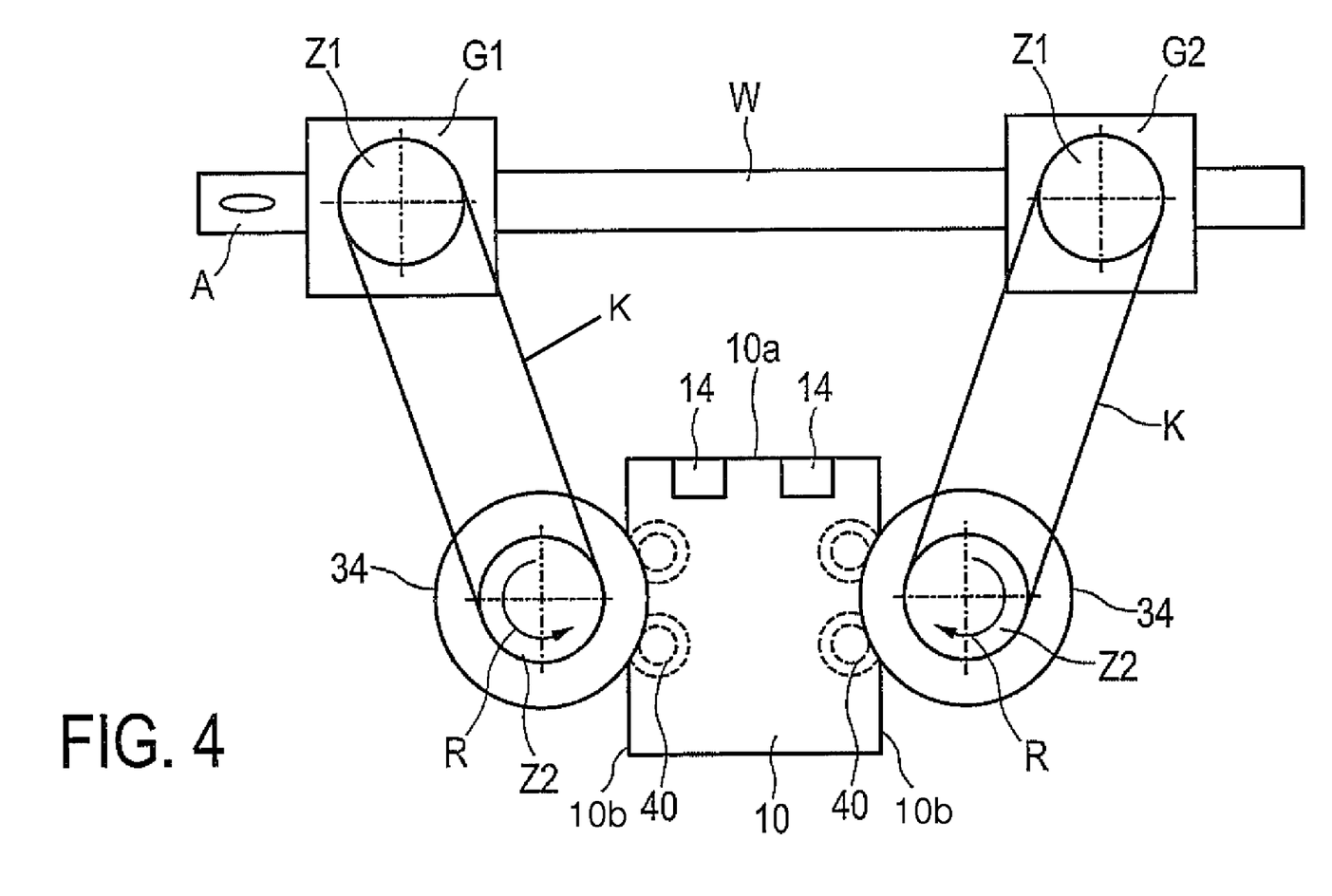
FIG. 4 is a schematic view of the drive unit of the drivable positive guidance mechanism of the transfer device shown in FIG. 1.

FIG. 4 shows a schematic view of the drive unit of the drivable positive guidance mechanism for support shaft 30 in the transfer device according to the invention. The drive essentially consists of two transmissions G1, G2 that are coupled to each other by means of a connecting shaft W. Each of transmissions G1, G2 has an output journal, which is connected by a transfer element K to one of support shafts 30.

As FIG. 4 shows, the two transmissions G1, G2 are arranged in a horizontal plane above guide bar 10. They are coupled to each other, preferably with a fixed rotational speed, by connecting shaft W. Transmission G1 has a drive journal A oriented horizontally to the left, for introducing a torque, which is transferred to drive journal A by an electric motor, for example, to transmission G1. Transmission G2 is coupled to transmission G2, which is of substantially identical design, by the horizontally oriented connecting shaft W, which preferably transfers the same rotational speed to transmission G2 as is introduced to transmission G1 by drive journal A.

Transmissions G1, G2 each have an output shaft aligned horizontally and at right angles to drive journal A and to connecting shaft W, on each of which output shafts a drive element Z1, such as a gear wheel or a pulley, is mounted. Transmissions G1, G2 are also configured in such a way that drive elements Z1 of transmissions G1, G2 and drive elements Z2 of shaft 30 lie in one plane. Transfer element K, such as a chain or belt, connects drive elements Z1 of transmissions G1, G2 to drive elements Z2 of support shafts 30. The direction of rotation of drive elements Z1 of transmissions G1, G2 is the same as the direction of rotation R of drive elements Z2 of support shaft 30.

Transmissions G1, G2 are preferably gear drives with a fixed transmission ratio, but they may also be formed by other types of transmission, such as friction, hydraulic or pneumatic drives. Further adjustment of the rotational speed of support shafts 30 is possible by altering the diameter of, and/or the number of teeth on drive elements Z1, Z2.

The front and rear bearing assemblies VL, HL in which guide bar 10 is floatingly mounted are each formed by a pair of opposite protuberances 34 and the counter bearing elements 40 with which protuberances 34 are in contact. In other words, guide bar 10 is not fixedly connected to any other component of the transfer device or of the machine frame.

On its end faces 10c, guide bar 10 may have receiving means which permit direct or indirect connection of upstream or downstream devices. Such receiving means may be formed by form-locking guides, such as dovetail guides, cylinder guides or rectangular block guides. It is likewise possible to provide threaded holes in the smooth end faces 10c of guide bar 10 in order to fix components or devices to guide bar 10 by means of screws, or to provide these in addition to the guides described above, for example as safety elements.

Figure 5:
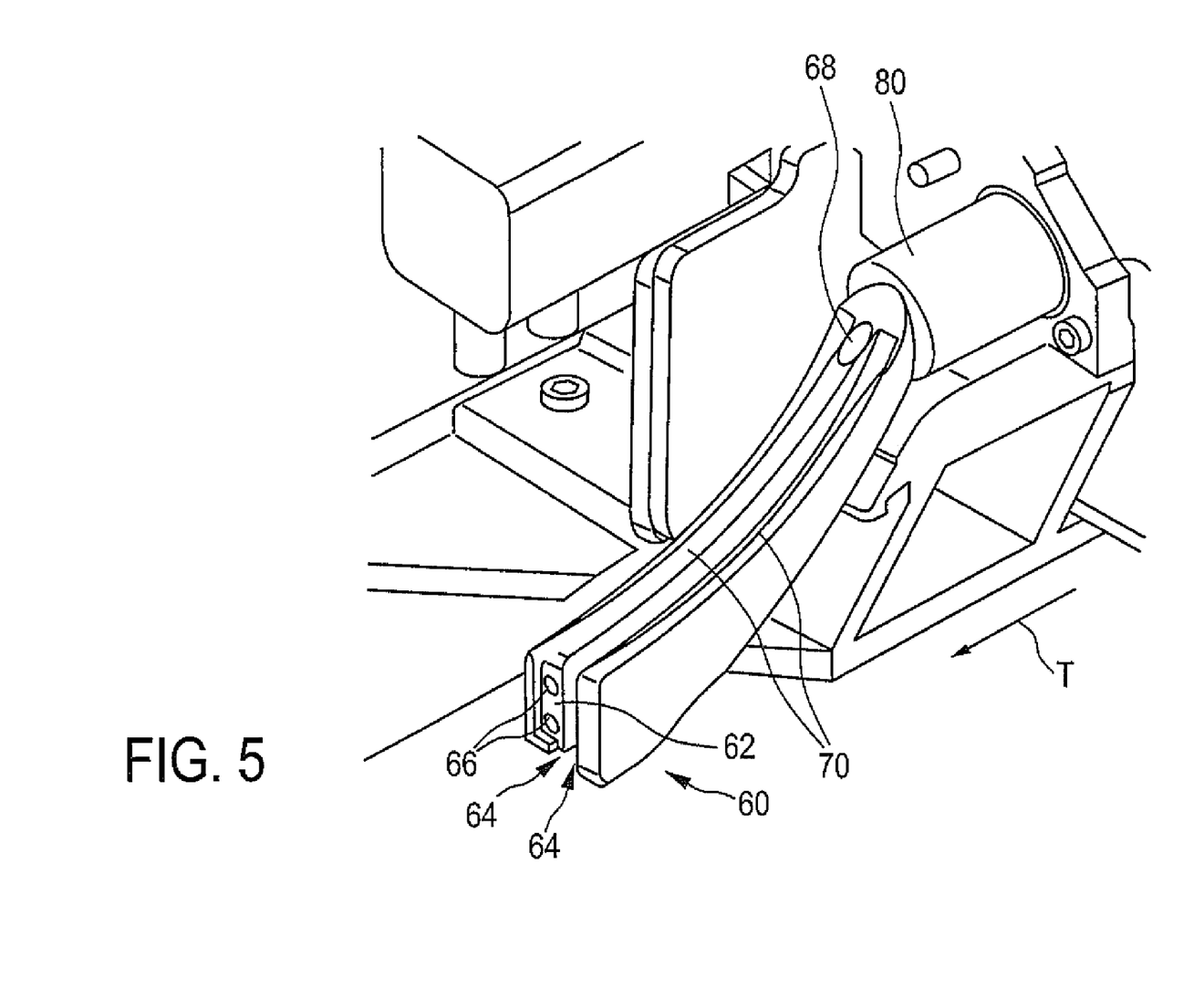
FIG. 5 is a perspective view of a possible attachment for the transfer device shown in FIG. 1.

FIG. 5 shows such a device 80, in the form of a screw conveyor, that can be connected to the upstream side of guide bar 10. To adapt the different cross-sections of guide bar 10 to screw conveyor 80, an intermediate element 60 is interposed therebetween. This intermediate element preferably consists of the same material as guide bar 10.

End face 62 of intermediate element 60, pointing in the direction of transport T and shown as free in FIG. 4, has the same cross-section as guide bar 10. In the opposite direction to the direction of transport T, intermediate element 60 extends from its guide bar end in an upward arcuate curve. Its cross-section changes almost continuously from square to circular, wherein the screw conveyor end terminates in a horizontally oriented, substantially cylindrical peg. Along said arcuate curve, the top side of intermediate element 60 forms an upwardly curving plane in which two grooves 70 running parallel in the direction of transport T are incorporated.

Intermediate element 60 is fixed with its end face 62 to the rear end face 10d of guide bar 10 as shown in FIG. 1. Two parallel perpendicular grooves 64 extend in end face 62 of intermediate element 60. In addition, through holes 66 extending horizontally in the direction of transport T are disposed vertically one above the other between grooves 64. End faces 10d of guide bar 10 have two projections which match grooves 64 and which engage in grooves 64 to produce a form-locking connection. In addition, intermediate element 60 is secured with two screws that are guided through through-holes 66 and screwed into matching threaded holes in end face 10d of guide bar 10. In the assembled state, grooves 70 of intermediate element 60 pass without transition into grooves 14 of guide bar 10.

As already mentioned, the rear, horizontally extending end of intermediate element 60, in relation to the direction of transport T, has a circular cross-section. A through hole 68 beginning between the right-hand ends of grooves 70 in FIG. 1 extends horizontally in the opposite direction to the direction of transport T. Screw conveyor worm 80 is connected to the right-hand, rear end of intermediate element 60 as seen in FIG. 5. For this purpose, the cylindrical end is inserted into a matching recess in the end face of screw conveyor 80 and is secured against slipping out or rotating by a screw (not shown) that is guided through through-hole 68.

In operation, a sausage-shaped product that is finished in the clipping machine and provided with a suspension loop is suspended from screw conveyor 80 and transported away from the clipping machine. At the end of screw conveyor 80 facing in the direction of transport T, the sausage-shaped product suspended by the loop slides along intermediate element 60 until it reaches the rear end of guide bar 10. In the process, the loop is successively looped around screw conveyor 80, intermediate element 60 and guide bar 10.

On a chain conveyor disposed parallel to and above guide bar 10, gripping elements (not shown) are guided in such a way that their two hook elements arranged parallel to each other move initially through grooves 70 at a first deflection point of the chain conveyor. At a chain conveyor section connected thereto and extending parallel to guide bar 10, the hook elements are guided horizontally through grooves 14 of guide bar 10. During this movement, the hook elements are in a position for receiving and holding the loops, i.e., their bottom ends extend parallel with and in grooves 70, 14 of intermediate element 60 and of guide bar 10.

Due to the conveying movement of the chain conveyor, the sausage-shaped product is moved forwards along guide bar 10 in the direction of transport T and passes bearing assemblies VL, HL of guide bar 10. As described in the foregoing, guide bar 10 is held by the convex protuberances 34 that engage in recesses 16 of guide bar 10. The protuberances 34 fixedly connected to support shafts 30 rotate with support shafts 30. Protuberances 34 have grooves 36 that extend in the form of threads along their surface. Since the loop moves between two adjacent raised portions of thread grooves 36, transportation of it is not impeded, but additionally benefited, during movement of the loop through bearing assemblies VL, HL, by the counter bearing shafts 40 which are in contact with the outer circumference of protuberances 34.

At the front end of guide bar 10, in relation to the direction of transport T, another device (not shown) for receiving the sausage-shaped products may be connected, such as a smoking rod in a suitable holding means. In order to hold such a device securely in place, end face 10c of guide bar 10 may have a corresponding receiving means, such as grooves, or projections which serve as a support.

The guide bar 10 described in the embodiment described in the foregoing has two grooves 14 extending along its top side. However, it is basically possible to provide only one groove, or more than two grooves 14.

It is also conceivable, especially when the guide bar is very long or when the sausage-shaped products are heavy, that more than two bearing assemblies VL, HL are provided for guide bar 10, in order to prevent the latter from sagging.

Unlike in the embodiment shown, the opposite protuberances of a bearing assembly VL, HL may also be arranged offset from each other along guide bar 10, wherein secure mounting of guide bar 10 remains assured. The number of protuberances 34 may also vary. In the simplest case, it suffices to have two protuberances 34 that engage in a side surface 10b of guide bar 10, and one protuberance 34 that engages in the opposite side surface 10b of guide bar 10.

However, it is likewise possible to arrange more than two protuberances 34 offset from each other on either side of guide bar 10, or to provide only one protuberance 34 that extends across the entire length of guide bar 10. In this way, solely by means of protuberances 34 with their thread-shaped grooves 36, it is possible to transport the sausage products, suspended by their suspension elements from guide bar 10, along guide bar 10.

However, the two bearing units 30, 34; 40, 42 of a front and rear bearing assembly VL, HL can also be designed in such a simplified form that only two counter bearing shafts 40 arranged vertically one above the other are provided, in which the support shaft elements 30, 34 of the two opposite support shafts 30 engage. In that case, only one recess extending between the side surfaces 10b of guide bar 10, and in the middle of which recess the two counter bearing shafts 40 are vertically arranged one above the other, is provided in each bearing assembly VL, HL, not two opposite recesses 16.

Guide bar 10 of the above embodiment is horizontally oriented. However, the proposed bearing assemblies VL, HL also permit the guide bar 10 to be oriented at an almost arbitrary angle to the horizontal, for example to overcome differences in height between machinery components. In such a case, it is then advantageous to also orient the chain conveyor carrying the hook elements at the respective angle.

However, the transfer device according to the invention is not limited to the proposed application of transferring sausage-shaped products. In principle, any products provided with an appropriate loop-shaped suspension element can be transported and transferred by the device.

Having described the invention, what is claimed is:

1. A device for transferring sausage-shaped products that are carried out of a clipping machine and provided with loop-shaped suspension elements, to a product receiving element, the device comprising:
   a guide bar along which the suspension elements are guided in a direction of transport by conveyor elements;
   front and rear bearing assemblies for the guide bar, the bearing assemblies having a right-hand and a left-hand bearing unit in each case are disposed in pairs laterally from the guide bar;
   the front and the rear bearing assemblies form drivable positive guidance mechanisms for the suspension elements;
   the right-hand and left-hand bearing units of the front and rear bearing assemblies each have at least one support bearing element and two counter bearing elements;
   the support bearing element of one bearing unit is formed by a drivable support shaft, the axis of which extends substantially parallel to the direction of transport;
   the support bearing elements of the two right-hand and of the two left-hand bearing units of the front and rear bearing assemblies are each formed by a common support shaft.

2. The transfer device of claim 1, wherein the positive guidance mechanism for the suspension elements is formed by a guide gap defined between mutually contacting and rotating bearing elements of the bearing units.

3. The transfer device of claim 2, wherein at least the mutually contacting surface sections of the bearing elements of the bearing units have a high friction coefficient at least in sections thereof.

4. The transfer device of claim 1, wherein at least one part of the bearing elements of the bearing units is provided at its outer circumference with at least one circumferential groove extending in the form of a thread in the direction of transport.

5. The transfer device of claim 1, wherein the central longitudinal axis of the support bearing element and the central longitudinal axis of the two counter bearing elements of a bearing unit are arranged in relation to one another in such a way that, when viewed in a plane perpendicular to the direction of transport, they span a triangle.

6. The transfer device of claim 5, wherein the two counter bearing elements of a bearing unit are arranged one above the other, when viewed in a plane perpendicular to the direction of transport.

7. The transfer device of claim 1, wherein the counter bearing elements of a bearing unit are formed by counter bearing shafts which rotate about their central longitudinal axis.

8. The transfer device of claim 1, wherein the axes of the counter bearing shafts extend substantially parallel to the direction of transport.

9. The transfer device of claim 1, wherein the support bearing element is disposed laterally from and between the two counter bearing elements, when viewed in a plane perpendicular to the direction of transport.

10. The transfer device of claim 1, wherein the support shafts of the right-hand and left-hand bearing units are driven synchronously and in opposite directions by a preferably common drive unit.

11. The transfer device of claim 1, wherein the support bearing element of a bearing unit has a convex protuberance or a concave recess at its outer circumference.

12. The transfer device of claim 11, wherein the counter bearing element of a bearing unit is provided at its outer circumference with a configuration in the form of a concave recess or convex protuberance corresponding to the convex protuberance or to the concave recess of the support bearing element and mutually engaging therewith.

13. The transfer device of claim 1, wherein the first and the second bearing units are arranged opposite one another on side surfaces of the guide bar.

14. The transfer device of claim 1, wherein the guide bar is a beam with preferably rectangular cross-section.

15. The transfer device of claim 14, wherein the front and the rear bearing assemblies each engage two side surfaces of the beam.

16. The transfer device of claim 1, wherein the guide bar is provided with recesses positioned one after the other in the direction of transport on both sides of the guide bar.

17. The transfer device of claim 16, wherein the recesses are arranged transversely to the direction of transport and opposite one another on the side surfaces of the guide bar.

18. The transfer device of claim 16, wherein the at least two counter bearing elements of a bearing unit are each disposed inside one recess of the guide bar.

19. The transfer device of claim 17, wherein the counter bearing element extends over the entire length of the recess.

20. The transfer device of claim 1, wherein the guide bar has at least one groove on its upper side and extending over its entire length.

21. The transfer device of claim 1, wherein the guide bar has receiving means at its ends for connecting additional devices.

22. The transfer device of claim 1, wherein the two counter bearing elements of a bearing unit are arranged one above the other, when viewed in a plane perpendicular to the direction of transport.

* * * * *